(12) United States Patent
Soriaga et al.

(10) Patent No.: US 9,344,914 B2
(45) Date of Patent: May 17, 2016

(54) MODEM ASSISTED CONTENTION HANDLING OF MULTIPLE ACTIVE CONNECTIONS IN WIRELESS COMMUNICATIONS

(71) Applicant: QUALCOMM Incorporated, San Diego, CA (US)

(72) Inventors: Joseph Soriaga, San Diego, CA (US); Jun Hu, San Diego, CA (US); Huang Lou, San Diego, CA (US); Jing Sun, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/284,053

(22) Filed: May 21, 2014

(65) Prior Publication Data

US 2015/0341825 A1 Nov. 26, 2015

(51) Int. Cl.
*H04W 76/04* (2009.01)
*H04W 28/04* (2009.01)
*H04W 8/18* (2009.01)
*H04W 76/06* (2009.01)
*H04W 88/06* (2009.01)

(52) U.S. Cl.
CPC ............ *H04W 28/048* (2013.01); *H04W 76/04* (2013.01); *H04W 8/183* (2013.01); *H04W 76/064* (2013.01); *H04W 88/06* (2013.01)

(58) Field of Classification Search
CPC ....... H04B 1/406; H04B 1/109; H04W 8/183; H04W 8/806

USPC ......................... 455/450, 63.1, 417
See application file for complete search history.

(56) References Cited

U.S. PATENT DOCUMENTS 5,995,540 A * 11/1999 Draganic ................. 375/222
8,576,901 B2    11/2013 Tat et al.
2006/0234693 A1* 10/2006 Isidore et al. .............. 455/422.1

(Continued)

FOREIGN PATENT DOCUMENTS

GB      2502969 A     12/2013
WO  WO-2006095224 A1   9/2006
WO  WO-2013150171 A1  10/2013

OTHER PUBLICATIONS

International Search Report and Written Opinion—PCT/US2015/030226—ISA/EPO—Aug. 4, 2015.

*Primary Examiner* — William Nealon
(74) *Attorney, Agent, or Firm* — Loza & Loza LLP

(57) ABSTRACT

Aspects of the present disclosure provide wireless communication devices and methods configured to operate with multiple active connections. A user equipment establishes a first active connection associated with a first subscription. The user equipment also establishes a second active connection, simultaneous to the first active connection, associated with a second subscription. The user equipment provides modem information corresponding to connection qualities of the first active connection and second active connection, to an operating system of the user equipment. Furthermore, the user equipment mitigates contention between the first active connection and second active connection by degrading at least one of the first active connection or second active connection in accordance with a decision given by the operating system based on the modem information.

20 Claims, 15 Drawing Sheets

(56) References Cited

U.S. PATENT DOCUMENTS

| | | | |
|---|---|---|---|
| 2008/0293394 A1* | 11/2008 | Silver et al. | 455/417 |
| 2009/0318087 A1* | 12/2009 | Mattila et al. | 455/63.1 |
| 2012/0329407 A1 | 12/2012 | Rousu et al. | |
| 2013/0012135 A1* | 1/2013 | Ruohonen et al. | 455/63.1 |
| 2013/0156081 A1* | 6/2013 | Tat et al. | 375/222 |
| 2013/0329639 A1 | 12/2013 | Wietfeldt et al. | |
| 2014/0050146 A1 | 2/2014 | Chrisikos et al. | |
| 2014/0092800 A1 | 4/2014 | Cho et al. | |

* cited by examiner

Access Network

Protocol Stack

MODEM ASSISTED CONTENTION HANDLING OF MULTIPLE ACTIVE CONNECTIONS IN WIRELESS COMMUNICATIONS

TECHNICAL FIELD

The technology discussed below relates generally to wireless communication systems, and more particularly, to a wireless terminal equipped to simultaneously operate with at least two subscriptions and similar methods.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP).

Generally, wireless user equipment (UE) (also referred to as mobile station (MS), mobile terminal (MT), access terminal (AT), etc. in various literature) configured for UMTS uses a Universal Integrated Circuit Card (UICC) (generally referred to as a SIM card) to store subscriber identity and for other security and authentication purposes. More recently, some UEs have two or more UICCs or SIM cards such that the user of the device can simultaneously engage in a voice call and/or data call on two or more cellular subscriptions. These subscriptions might be on the same network or different networks.

A UE with multiple SIM cards is generally referred to as a multi-SIM device. Some multi-SIM UEs share radio frequency (RF) resources (e.g., modem, transceiver, etc.) for accessing multiple subscriptions simultaneously. One category of multi-SIM devices is called a dual-SIM dual active (DSDA) device. A DSDA device can be simultaneously active on two subscriptions in a traffic mode, and may accordingly exhibit coexistence issues.

BRIEF SUMMARY OF SOME EXAMPLES

As mentioned above, the technology discussed in this patent application relates to wireless communication devices and methods configured to operate with multiple active connections. In some scenarios, contention issues may occur due to the multiple active connections. When contention occurs, device performance may degrade thereby affecting user experience. Some embodiments of the present invention, as discussed in more detail below, enable and provide a user or operating system on communication devices to prioritize connections (or subscriptions) based on one or more various factors as a way to lower and/or remove contention impact.

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one embodiment of the present invention, a method of wireless communication operable at a user equipment (UE) is provided. The UE establishes a first active connection associated with a first subscription; and establishes a second active connection, simultaneous to the first active connection, associated with a second subscription. The UE provides modem information corresponding to connection qualities of the first active connection and second active connection, to an operating system of the UE, and mitigates contention between the first active connection and second active connection by degrading at least one of the first active connection or second active connection in accordance with a decision given by the operating system based on the modem information.

Another embodiment of the present invention provides a method of wireless communication operable at a user equipment (UE). The UE establishes a first active connection associated with a first subscription; and establishes a second active connection, simultaneous to the first active connection, associated with a second subscription. The UE mitigates contention between the first active connection and second active connection by degrading at least one of the first active connection or second active connection in accordance with a decision made by a modem of the UE, based on respective connection qualities of the first active connection and second active connection determined by the modem.

Another embodiment of the present invention provides a user equipment (UE) for wireless communication. The UE includes a first subscription access circuitry configured to establish a first active connection associated with a first subscription; and a second subscription access circuitry configured to establish a second active connection, simultaneous to the first active connection, associated with a second subscription. The UE further includes a modem circuitry configured to provide modem information corresponding to connection qualities of the first active connection and second active connection, to an operating system of the UE; and at least one processor. The at least one processor is configured to: receive the modem information from the modem circuitry; and mitigate contention between the first active connection and second active connection by degrading at least one of the first active connection or second active connection in accordance with a decision given by the operating system based on the modem information.

Another embodiment of the present invention provides a user equipment (UE) for wireless communication. The UE includes: a first subscription access circuitry configured to establish a first active connection associated with a first subscription; and a second subscription access circuitry configured to establish a second active connection, simultaneous to the first active connection, associated with a second subscription. The UE further includes a modem circuitry configured to mitigate contention between the first active connection and second active connection by degrading at least one of the first active connection or second active connection in accordance with a decision made by the modem circuitry based on respective connection qualities of the first active connection and second active connection determined by the modem circuitry.

Another embodiment of the present invention provides a computer-readable medium including code for causing a user equipment (UE) for wireless communication to: establish a first active connection associated with a first subscription; and establish a second active connection, simultaneous to the first active connection, associated with a second subscription. The code further causes the UE to provide modem information corresponding to connection qualities of the first active connection and second active connection, to an operating system of the UE; and mitigate contention between the first active connection and second active connection by degrading at least one of the first active connection or second active connection in accordance with a decision given by the operating system based on the modem information.

Another embodiment of the present invention provides a computer-readable medium including code for causing a user equipment (UE) for wireless communication to: establish a first active connection associated with a first subscription; and establish a second active connection, simultaneous to the first active connection, associated with a second subscription. The code further causes the UE to mitigate contention between the first active connection and second active connection by degrading at least one of the first active connection or second active connection in accordance with a decision made by a modem of the UE, based on respective connection qualities of the first active connection and second active connection determined by the modem.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

One or more aspects of the disclosure provide for a UE that can establish simultaneous connections on two or more subscriptions when sharing common RF resources. The subscriptions may be using the same or different radio access technologies (RATs) such as GSM, W-CDMA, CDMA2000, Long Term Evolution (LTE), etc. In one aspect of the disclosure, the UE may be a multi-SIM device (e.g., a DSDA device). In various aspects of the disclosure, the UE can achieve simultaneous operation of communication activities on multiple subscriptions by sharing the UE's RF resources in an intelligent fashion that can mitigate degradation of the communication activities. In some aspects of the disclosure, a user or operating system of the UE may make decision based on link information provided by a modem for handing contention without significantly degrading user experience. In other aspects of the disclosure, the modem itself may control attributes of the communication link in accordance with detected radio link information, to improve the user experience or mitigate impact to the network from contention.

Figure 1:
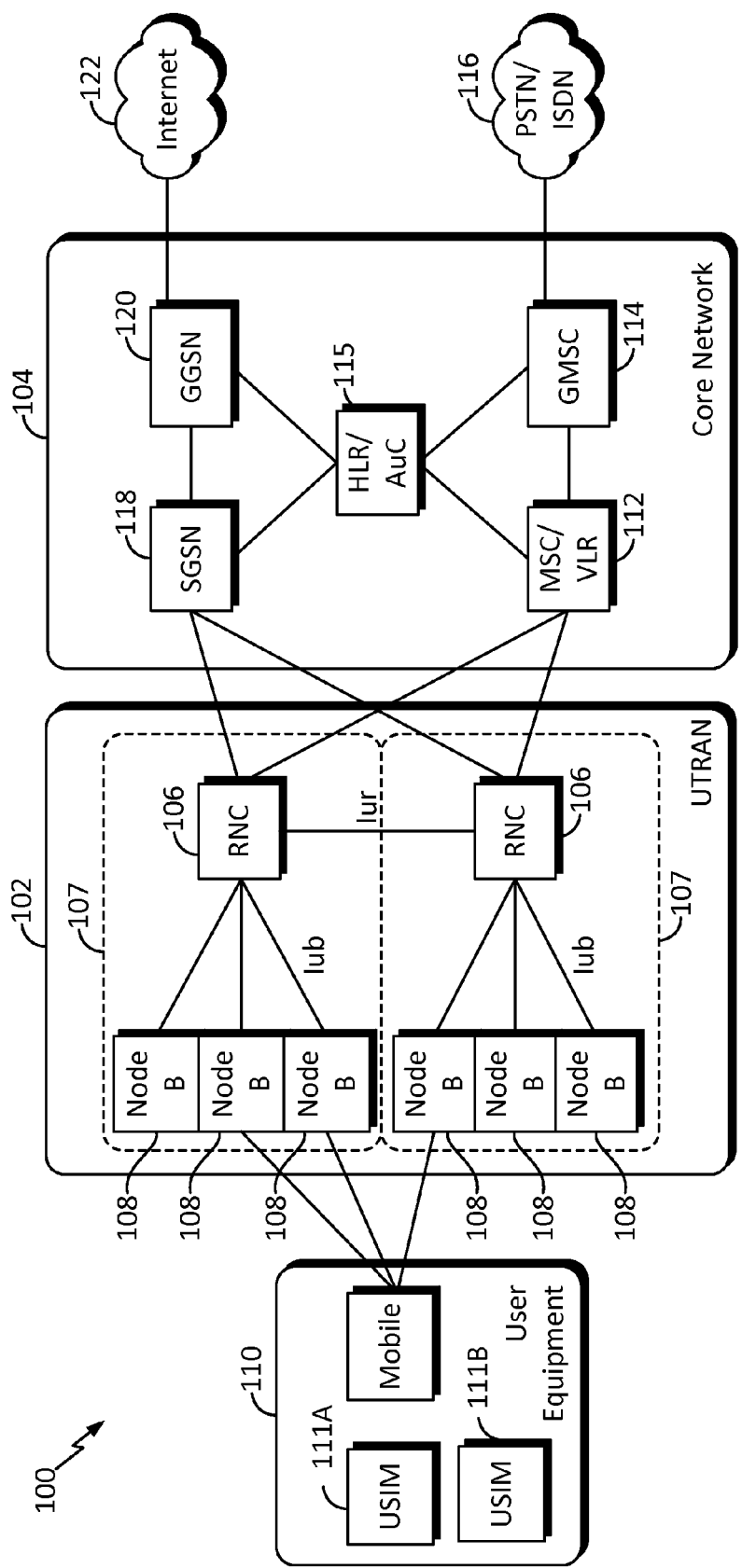
FIG. 1 is a block diagram conceptually illustrating an example of a telecommunications system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) network 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

In some aspects of the disclosure, the UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a smart watch, a session initiation protocol (SIP) phone, a laptop, a computing device, a notebook, a netbook, a smartbook, a personal digital assistant (PDA), a satellite radio, a global positioning system (GPS) device, a multimedia device, a video device, a digital audio player (e.g., MP3 player), a camera, a game console, a tablet computer, an entertainment device, a vehicle component, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) or SIM, which stores the subscriber's identity and provides a user's subscription information to a network as well as performing other security and authentication roles. In one aspect of the disclosure, the UE 110 may have multiple USIMs including a first USIM 111A and a second USIM 111B, which are associated with different subscriptions. In one aspect of the disclosure, the subscriptions may be associated with different networks similar or different from the network 100. For illustrative purposes, one UE 110 is shown in communication with a number of the Node Bs 108, which may be associated with the same or different subscriptions. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks such as CDMA2000 and LTE networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with an MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

The illustrated UE 110 includes two USIMs 111A and 111B, but those of ordinary skill in the art will understand that this is illustrative in nature only, and a UE may include any suitable number of USIMs. The USIM may be software, hardware or a combination of software and hardware. UEs such as the UE 110 having multiple USIMs are sometimes referred to as multi-SIM devices, with one particular example with two USIMs being called a DSDA device. A DSDA device is capable of establishing simultaneous connections with two networks (or subscriptions) while sharing an RF resource (e.g., transceiver) of the UE 110. In this way, active data calls and/or voice calls may be simultaneously established on both of the networks or subscriptions with a single DSDA device.

As described above, the illustrated UE 110 is an example of a DSDA device capable of simultaneously being connected with the UMTS network 100 and another network. Within the scope of the present disclosure, similar functionality may be achieved utilizing more than one radio access technology (RAT), wherein the UE can establish simultaneous connections on two or more subscriptions using two or more different RATs. For example, in various aspects of the disclosure, a UE 110 may establish simultaneous connections on one or more of a GSM network, an UMTS network, an LTE network, a CDMA2000 network, a Wi-MAX network, using any suitable RAT. Within the present disclosure, any devices capable of establishing simultaneous connections on two or more subscriptions on any one or any plural number of RATs may be generally referred to as dual-SIM devices or DSDA devices. In a DSDA device, for example, both active connections may be simultaneously active in transmitting information for a data or voice call.

Figure 2:
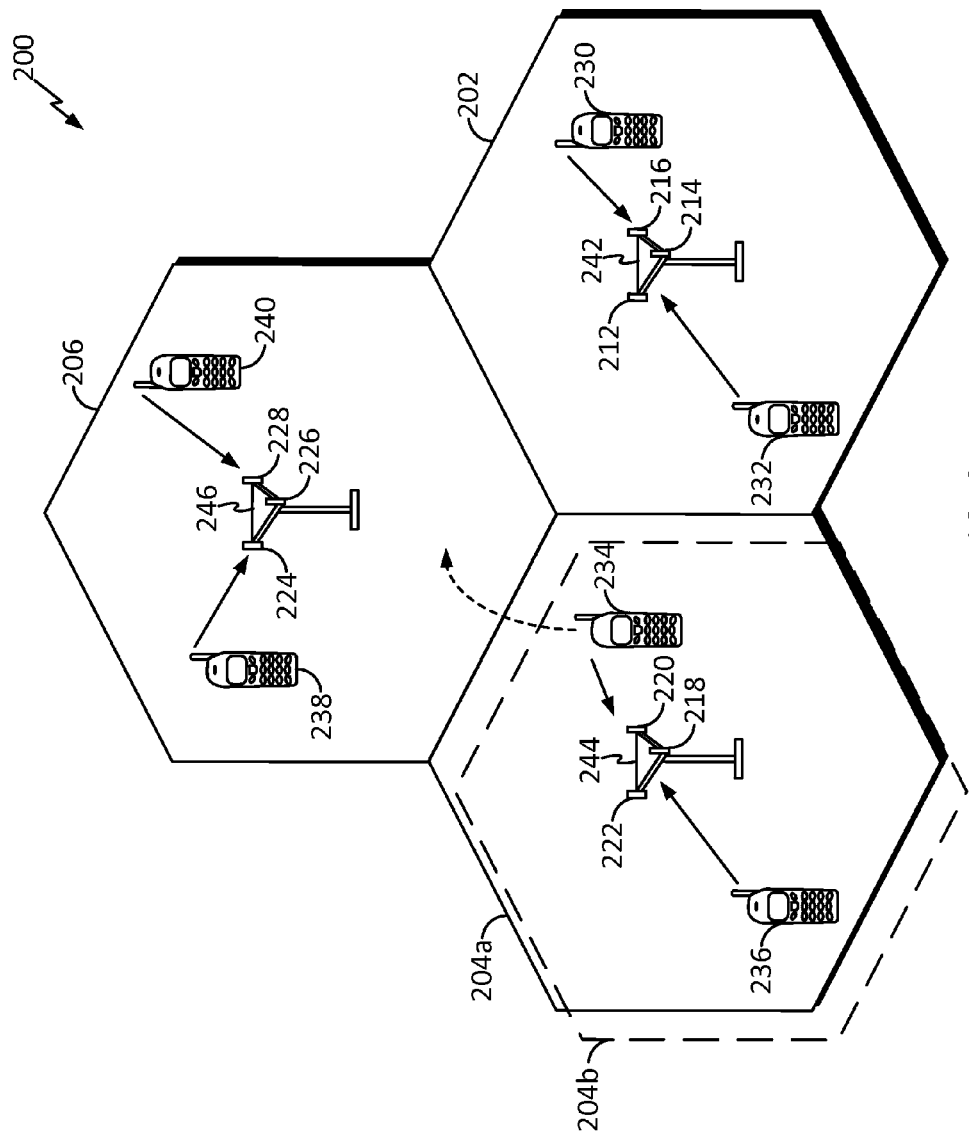
FIG. 2 is a conceptual diagram illustrating an example of an access network.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, a first cell may utilize a first scrambling code, and a second cell, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to one or more core network (e.g., core network 104 of FIG. 1) for all the UEs 230, 232, 234, 236, 238, and 240 in the respective cells 202, 204, and 206.

Any of the UEs 230, 232, 234, 236, 238, and 240 may be the UE 110 of FIG. 1. In some aspects of the disclosure, any of the UEs of FIG. 2 may be a DSDA device capable of simultaneously connecting with multiple subscriptions each associated with a corresponding network using the same of different RATs.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
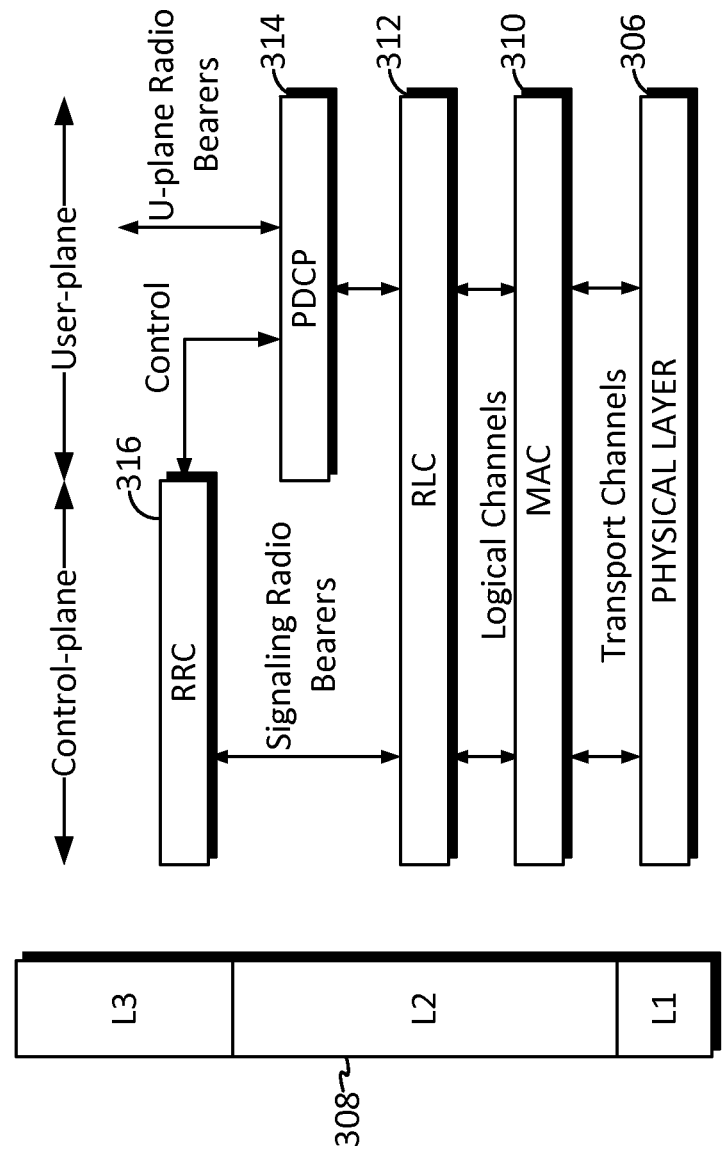
FIG. 3 is a conceptual diagram illustrating an example of a radio protocol architecture for user and control planes.
Figure 4:
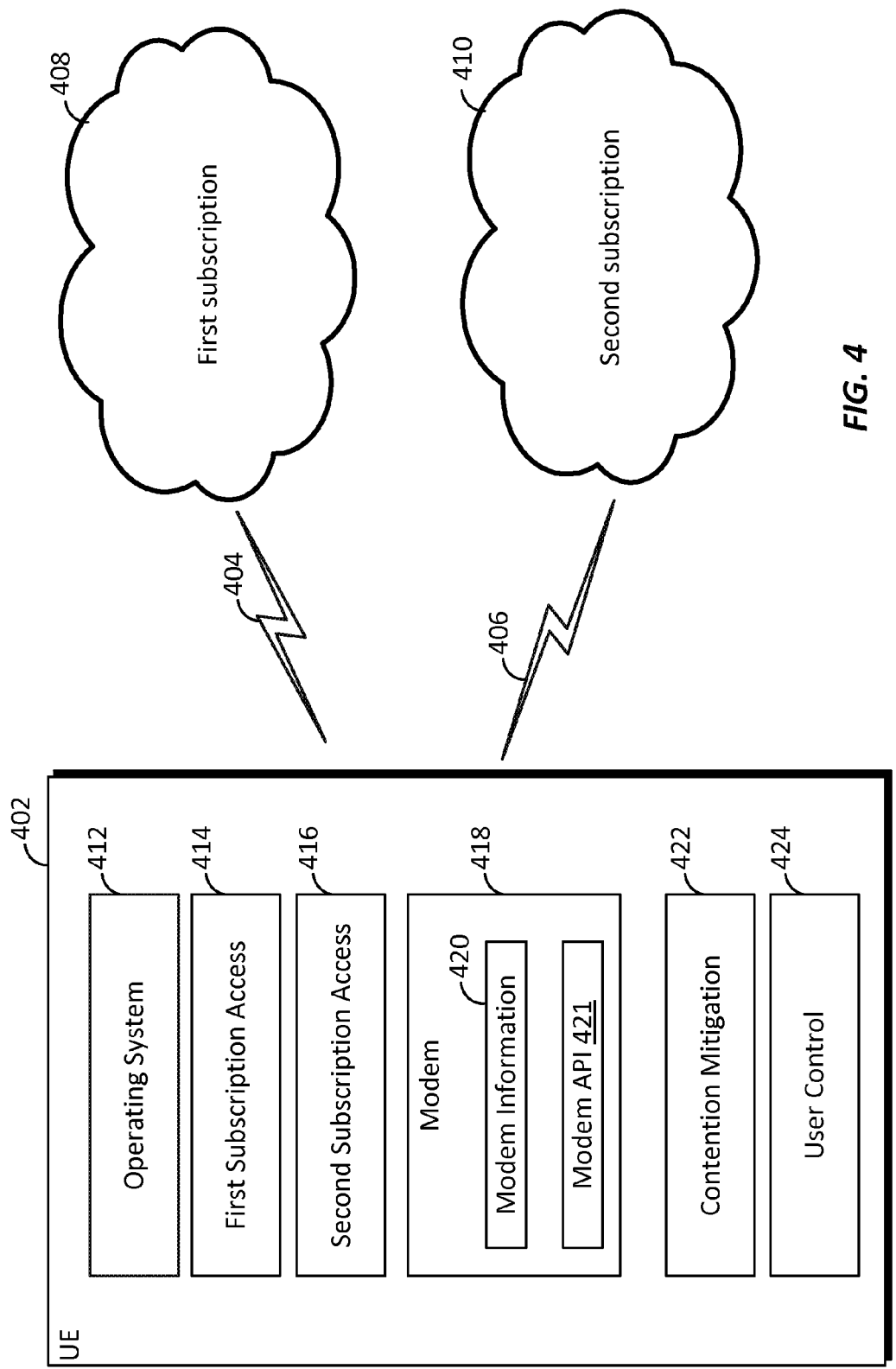
FIG. 4 is a conceptual diagram illustrating a dual SIM and dual active (DSDA) user equipment (UE) configured to use modem assisted contention handling to establish simultaneous connections with multiple subscriptions in accordance with aspects of the disclosure.

FIG. 3 is a conceptual diagram illustrating an example of a radio protocol architecture for the user and control plane that may be adapted at any of the UEs of FIGS. 1, 2, 4 and/or 15. Turning to FIG. 3, the AS is shown with three layers: Layer 1 (L1), Layer 2 (L2), and Layer 3 (L3). Layer 1 is the lowest layer and implements various physical layer signal processing functions. Layer 1 will be referred to herein as the physical layer 306. The data link layer, called Layer 2 308, is above the physical layer 306 and is responsible for the link between the UE and Node B over the physical layer 306.

At Layer 3, the radio resource control (RRC) layer 316 handles the control plane signaling between the UE and the Node B. RRC layer 316 includes a number of functional entities for routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

FIG. 4 is a conceptual diagram illustrating a DSDA UE 402 configured to use modem assisted contention handling to establish simultaneous active connections with multiple subscriptions in accordance with aspects of the disclosure. For example, the UE 402 may be any of the UEs of FIGS. 1, 2, and/or 5. The UE 402 supports simultaneous active connections 404 and 406 with a first subscription 408 and second subscription 410, respectively. The UE 402 includes various components that may be implemented in software, firmware, hardware, circuitry, or a combination thereof. For example, the UE 402 includes an operating system 412 that is configured to support simultaneous active connections with multiple subscriptions. In an aspect of the disclosure, the operating system 412 is software that manages hardware resources of the UE 402 and provides various services to applications running on the UE 402. Examples of the operating system 412 include Android®, iOS®, Window Phone®, etc. A first subscription access component 414 is provided for supporting and establishing the active connection 404 with the first subscription 408. A second subscription access component 416 is provided for supporting and establishing the active connection 406 with the second subscription 410. For example, both active connections 404 and 406 may be simultaneously in an active mode for receiving and/or transmitting user data (e.g., voice call or data call). Some possibilities for the traffic types between the two active connections include one connection supporting a voice call and while the other connection supports a data application (e.g., internet web browsing, media streaming, or file downloading), or both connections supporting two separate voice calls or two separate data applications.

The UE 402 includes a modem 418 that can be configured to provide modem information 420 to the operating system 412. For example, the modem can provide information about its operating state or connection qualities through a modem application program interface (API) 421. The modem information 402 may include link information about the active connections 404 and 406 (as well as other connections). By way of example and not limitation, the modem information 420 or connection qualities may include at least one of error rates, channel quality (e.g., channel quality indicator (CQI)), requested data rate, available data rate, receive power, transmit power headroom, round trip times, etc. The modem information 420 may include other suitable parameters as desired. The modem information 420 can be provided to a contention mitigation component 422.

The contention mitigation component 422 can mitigate contention between the first active connection 404 and second active connection 406. In one scenario, mitigation can occur by degrading at least one of the connections 404 and 406. Deciding to mitigate an active connection can be done in accordance with a decision given by the operating system 412 based on the modem information 420. Degrading an active connection may include at least one of putting a voice call on hold, throttling (decreasing data rate), suspending a data call, or ending a data or voice call.

In one aspect of the disclosure, the UE 402 also includes a user control component 424 that provides a user of the UE with information about the first and second connections 404 and 406. The user control component 424 may receive the information from the operating system 412, and provides that information to the user. Then, the user control component 424 receives an input from the user regarding which of the first and second connections to be degraded to mitigate contention. In aspects of the disclosure, the decision on how to mitigate contention may be made by the operating system 412 itself or the user. In some aspects of the disclosure, the decision may be made by the modem 418 itself without involving the operating system or user.

Figure 5:
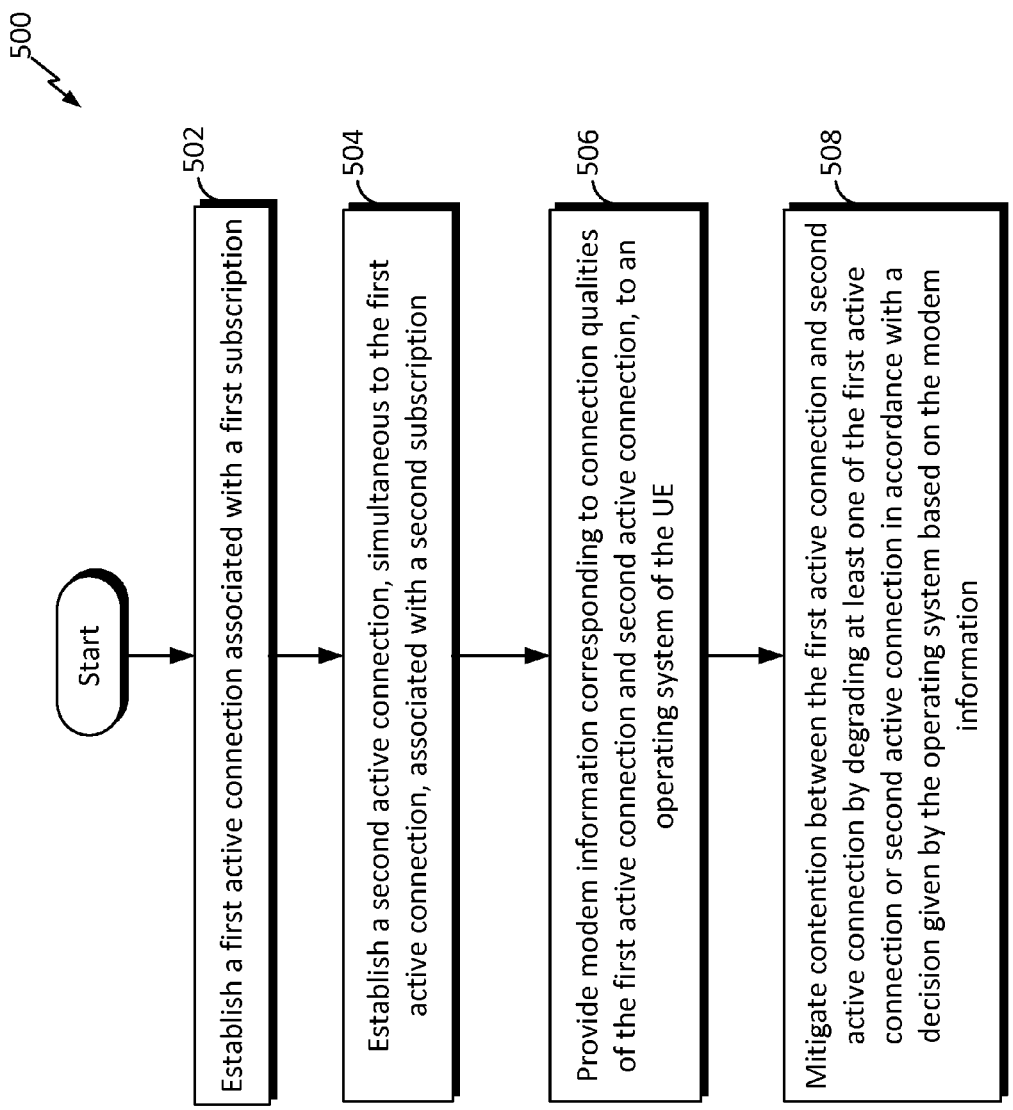
FIG. 5 is a flow chart illustrating a method of mitigating contention between simultaneous connections based on a decision given by an operating system in accordance with aspects of the disclosure.

FIG. 5 is a flow chart illustrating a process 500 of mitigating contention between simultaneous active connections based on a decision given by an operating system in accordance with an aspect of the disclosure. For example, the process 500 may be operable at any of the UEs of FIGS. 1, 2, 4, and/or 15. At block 502, a UE 402 establishes a first active connection associated with a first subscription. For example, a first subscription access component 414 of the UE 402 may establish a first active connection 404 with a first subscription 408 (see FIG. 4). At block 504, the UE may establish a second active connection, simultaneous to the first active connection, associated with a second subscription. The first active connection and second active connection are simultaneously kept in an active mode for transmitting user data (e.g., data call or voice call data). For example, the second subscription access component 416 of the UE may establish a second active connection 406, simultaneous to the first active connection 404 with a second subscription 410.

At block 506, modem information corresponding to connection qualities of the first active connection and second active connection is provided to an operating system. For example, the modem 418 may provide modem information 420 to the operating system 412 via a modem API 421. At block 508, a contention mitigation component 422 of the UE mitigates contention between the first active connection 408 and second active connection 410 by degrading at least one of the first active connection or second active connection in accordance with a decision given by the operating system based on the modem information. In various aspects of the disclosure, the decision may be made by the user or autonomously (i.e., without user input) by the operating system 412 and/or applications running at the UE. Examples of techniques for degrading one or both of the first and second active connections to simultaneously keep both connections in the active mode will be described in detail below.

Figure 6:
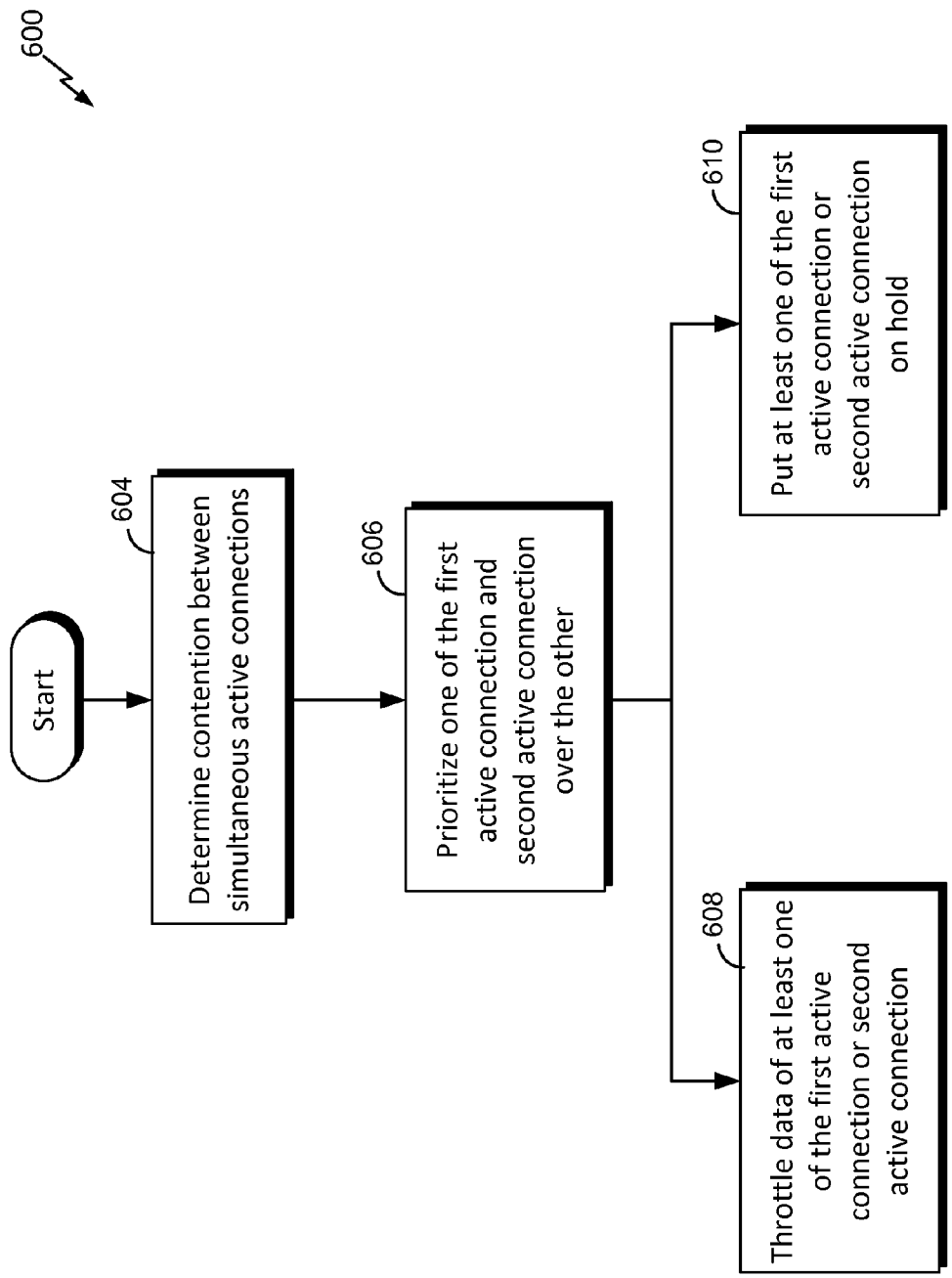
FIG. 6 is a flow chart illustrating examples of contention mitigation techniques in accordance with an aspect of the disclosure.

FIG. 6 is a flow chart illustrating examples of contention mitigation techniques 600 in accordance with aspects of the disclosure. For example, the contention mitigation techniques 600 may be operable at any of the UEs of FIGS. 1, 2, 4, and/or 15. In one example, a UE 402 establishes simultaneous active connections 404 and 406 with multiple subscriptions 408 and 410, where the connections are both kept in an active mode for receiving and/or transmitting user data. Each of the active connections 404 and 406 may be a data call or voice call. At block 604, the contention mitigation component 422 of the UE 402 determines contention between the simultaneous first and second active connections 404 and 406. If contention occurs between the connections, the contention mitigation component 422 may mitigate contention by using one or more of the following techniques.

At block 606, the UE 402 (e.g., contention mitigation component 422) may prioritize one of the first active connection 404 and second active connection 406 over the other. For example, the user data and/or voice data of one connection may be given higher priority than that of the other connection. At block 608, the UE 402 may throttle or suspend data of at least one of the first active connection 404 or second active connection 406 based on their relative priority. For example, data rate of one or more of the active connections with lower priority may be reduced. At block 610, the UE 402 may put at least one of the first and second active connections on hold based on their relative priority. For example, the UE 402 may put a voice call on one of the active connections with lower priority on hold. In one aspect of the disclosure, when a voice call is put on hold on a connection, the UE 402 may transmit traffic data at a lower rate than that during an active voice call, such as only sending keep-alive silence frames or periodic busy tones to let the other end know that the caller is on hold. An example of the lower data rate may result in an overall transmission activity of 0.5 ms for every 3-5 seconds or less for the voice call on hold. In some aspects of the disclosure, the various contention mitigation techniques of FIG. 6 may be applied individually or in different combinations at block 508 of FIG. 5.

Figure 7:
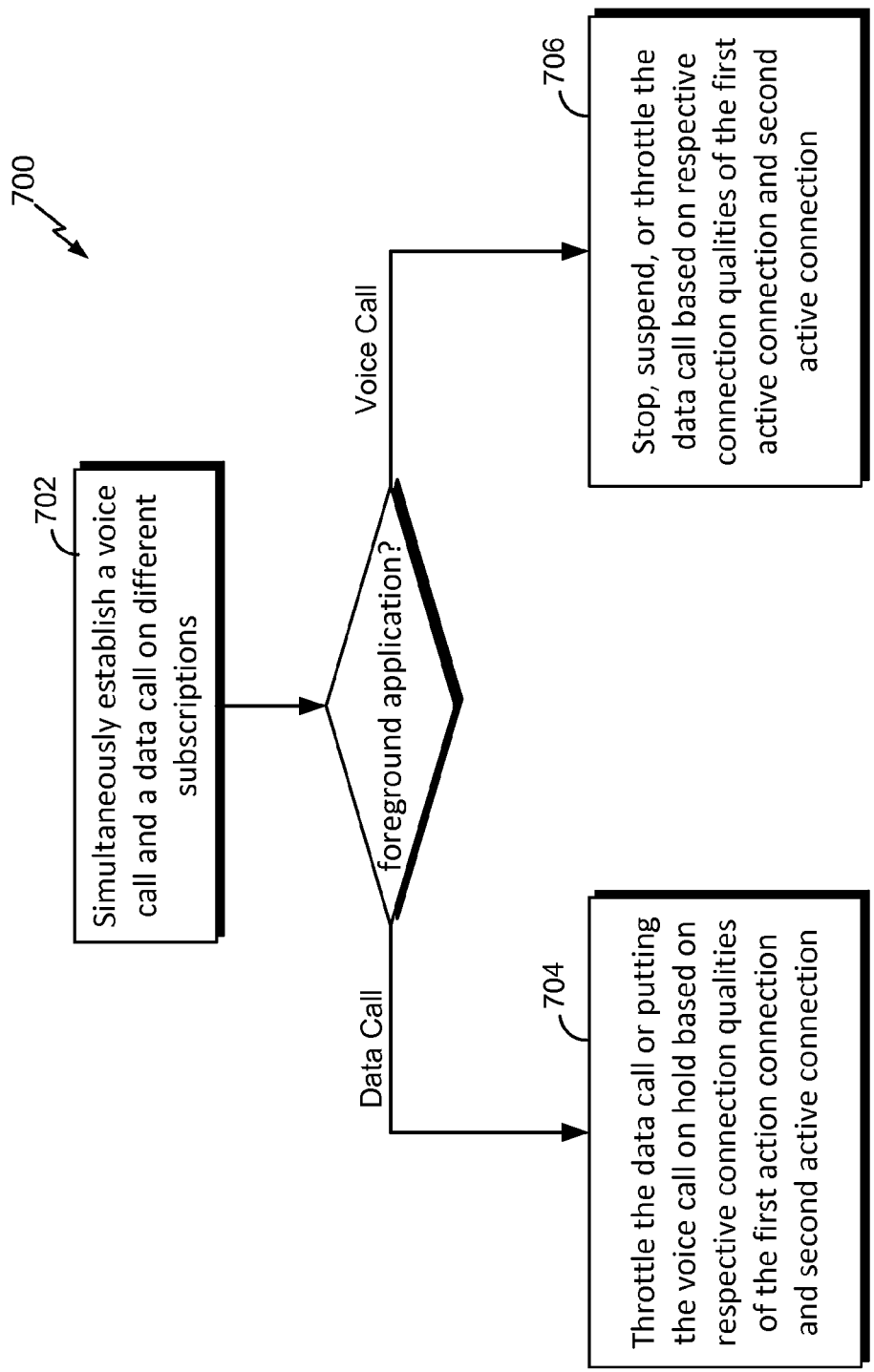
FIG. 7 is a flow chart illustrating a process of mitigating contention between simultaneous data and voice connections in accordance with an aspect of the disclosure.

FIG. 7 is a flow chart illustrating a process 700 of mitigating contention between simultaneous active data and voice connections in accordance with an aspect of the disclosure. For example, the process 700 may be operable at any of the UEs of FIGS. 1, 3, 4, and/or 15. At block 702, a UE 402 simultaneously establishes a voice call and a data call on different subscriptions. For example, the subscriptions may be the first and second subscriptions 408 and 410 of FIG. 4. To mitigate contention, the UE 402 (e.g., a contention mitigation component 422) may determine which of the voice call and data call is a foreground application. At block 704, if it is determined that the data call is a foreground application relative to the voice call, the UE 402 may throttle the data call or putting the voice call on hold based on respective connection qualities of the first active connection 404 and second active connection 406. At block 706, if it is determined that the voice call is a foreground application relative to the data call, the UE 402 may stop, suspend, or throttle the data call based on respective connection qualities of the first active connection 404 and second active connection 406.

Figure 8:
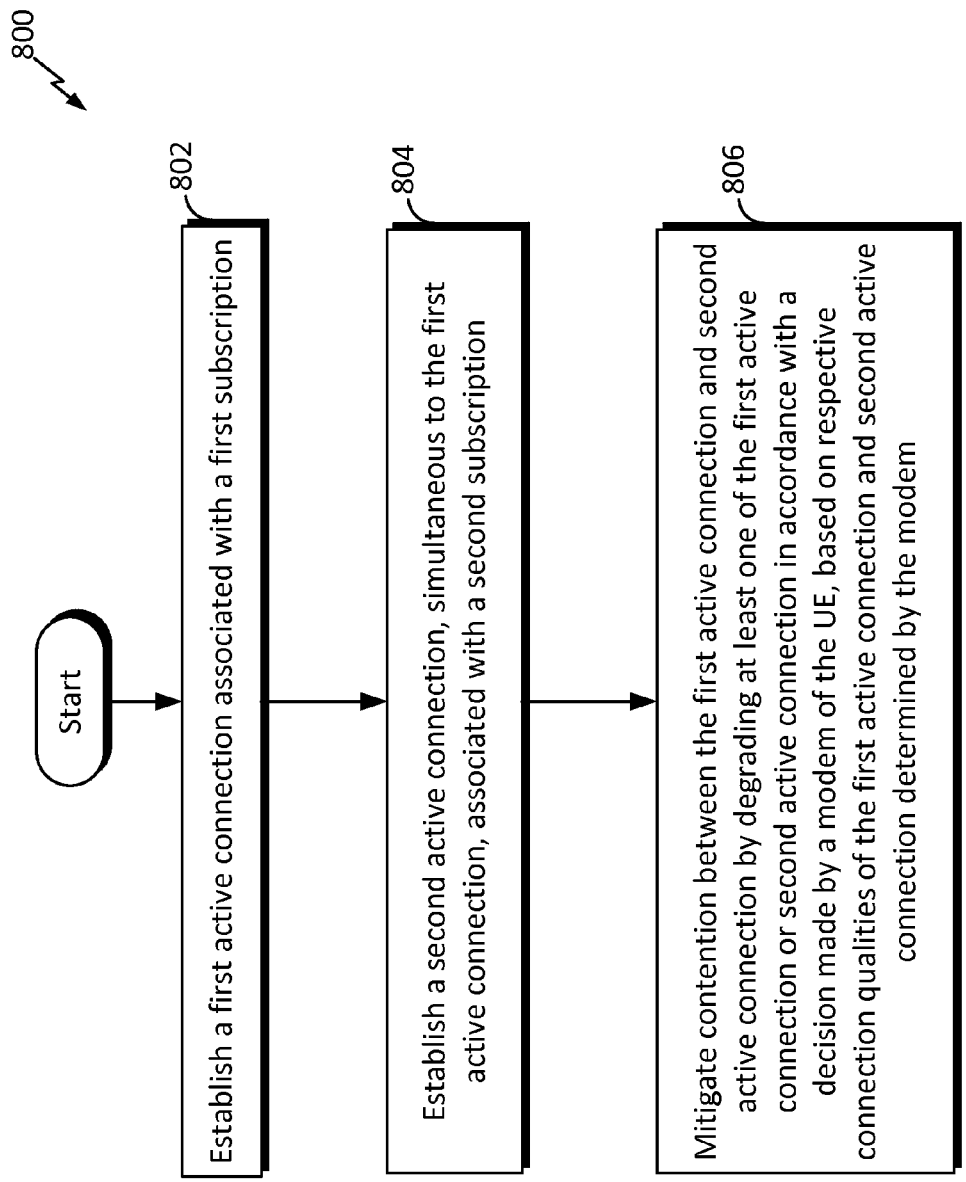
FIG. 8 is a flow chart illustrating a process of mitigating contention between simultaneous connections at an UE based on a decision made by a modem of the UE in accordance with an aspect of the disclosure.

FIG. 8 is a flow chart illustrating a process 800 of mitigating contention between simultaneous active connections based on a decision made by a modem of a UE in accordance with an aspect of the disclosure. For example, the process 800 may be operable at any of the UEs of FIGS. 1, 2, 4, and/or 15. At block 802, a UE 402 (e.g., a first subscription access component 414) establishes a first active connection 404 associated with a first subscription 408. At block 804, the UE 402 (e.g., second subscription access component 416) may establish a second active connection 406, simultaneous to the first active connection 404, associated with a second subscription 410. The first active connection 404 and second active connection 406 are simultaneously kept in an active mode for receiving and/or transmitting user data, by a modem 418 of the UE.

At block 806, the UE 402 (e.g., a contention mitigation component 422) mitigates contention between the first active connection 404 and second active connection 406 by degrading at least one of the first active connection 404 or second active connection 406 in accordance with a decision made by the modem 418 based on respective connection qualities of the first active connection 404 and second active connection 406 determined by the modem 418. Examples of techniques for degrading one or both of the first and second active connections to simultaneously keep them in the active mode will be described in detail below. In various aspects of the disclosure, the mitigation techniques described in FIGS. 6 and/or 7 may be applied at block 806.

Examples of DSDA Connection Management Embodiments

FIGS. 9-14 are diagrams illustrating some examples of simultaneous active connections contention management scenarios that may be mitigated by the contention mitigation techniques illustrated in FIGS. 4-8 in accordance with some aspects of the disclosure. These examples are not exhaustive, and the inventive concept and techniques of the present disclosure may be applied in other call management scenarios at any UE illustrated in FIGS. 1, 2, 4, and/or 15.

Figure 9:
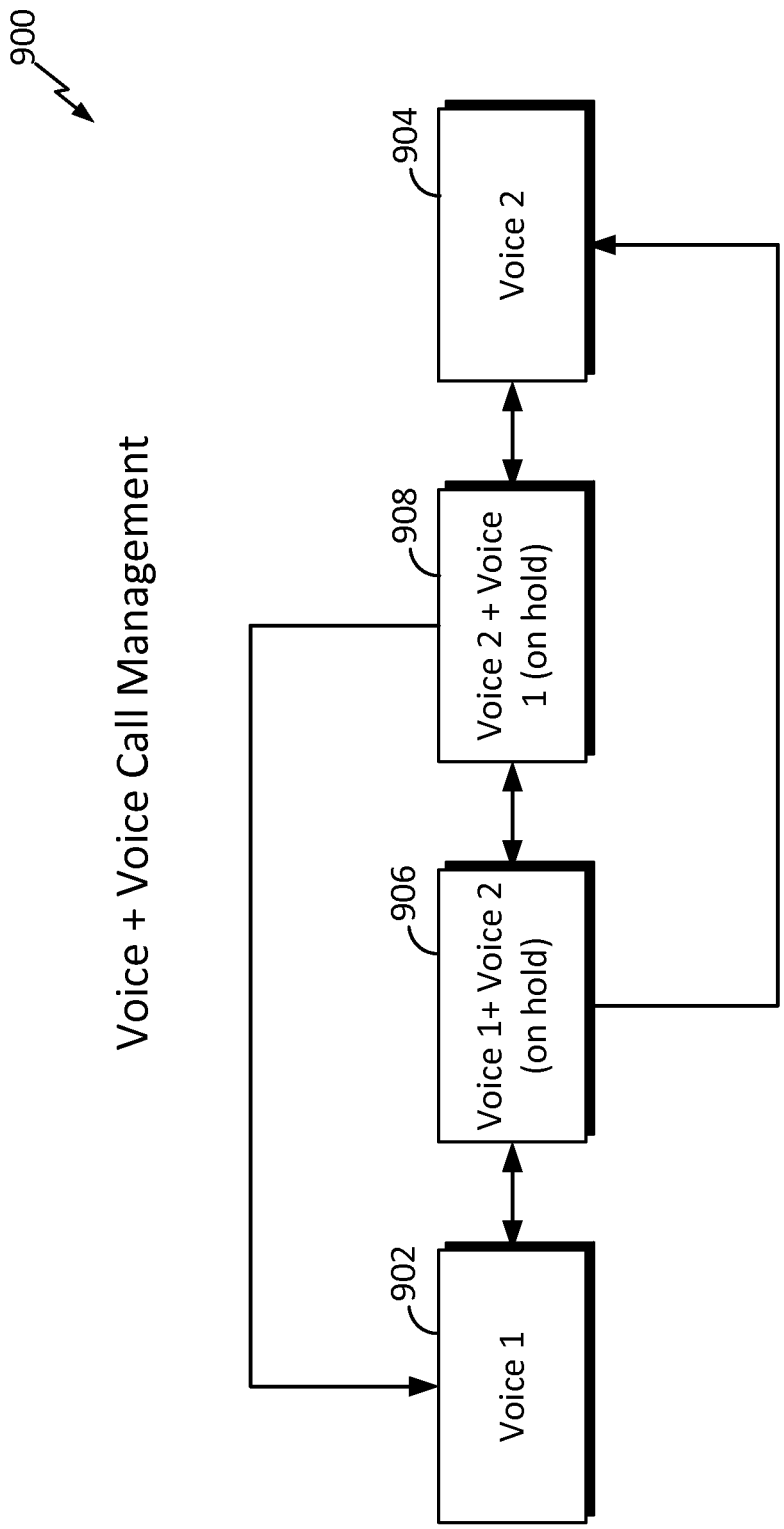
FIG. 9 is a diagram illustrating an example of dual voice calls management process in accordance with an aspect of the disclosure.

FIG. 9 is a diagram illustrating an example of a dual voice call management process 900 in accordance with an aspect of the disclosure. For example, the process 900 may be operable at any of the UEs of FIGS. 1, 2, 4, and/or 15. A UE may establish a first voice call 902 and a second voice call 904 with different subscriptions. Initially, the UE may have only the first voice call. At a certain time, for example, the UE may need to handle the second voice call 904 while the first voice call 902 is still ongoing. At block 906, the UE may continue with the first voice call, but put the second voice call 904 on hold. At block 908, the UE may put the first voice call on hold and make the second voice call active. From block 908, if the second voice call is ended, the UE may switch back to the first voice call. From block 906, when the second voice call is on hold, the UE 402 may switch to the second voice call and ends the first voice call. For any voice call put on hold, the UE may keep the active connection alive by transmitting at a data rate lower than that during an active voice call, transmitting periodic tones, or forgoing data transmission except keep-alive data. In the process 900, only one of the voice calls is kept active at a time. In aspects of the disclosure, the decision to switch between the voice calls, put a voice call on hold, and/or end a voice call may be made by an operating system 412 or the user of a UE 402 through the operating system, which may provide information of the calls to the user based on modem information 420.

Figure 10:
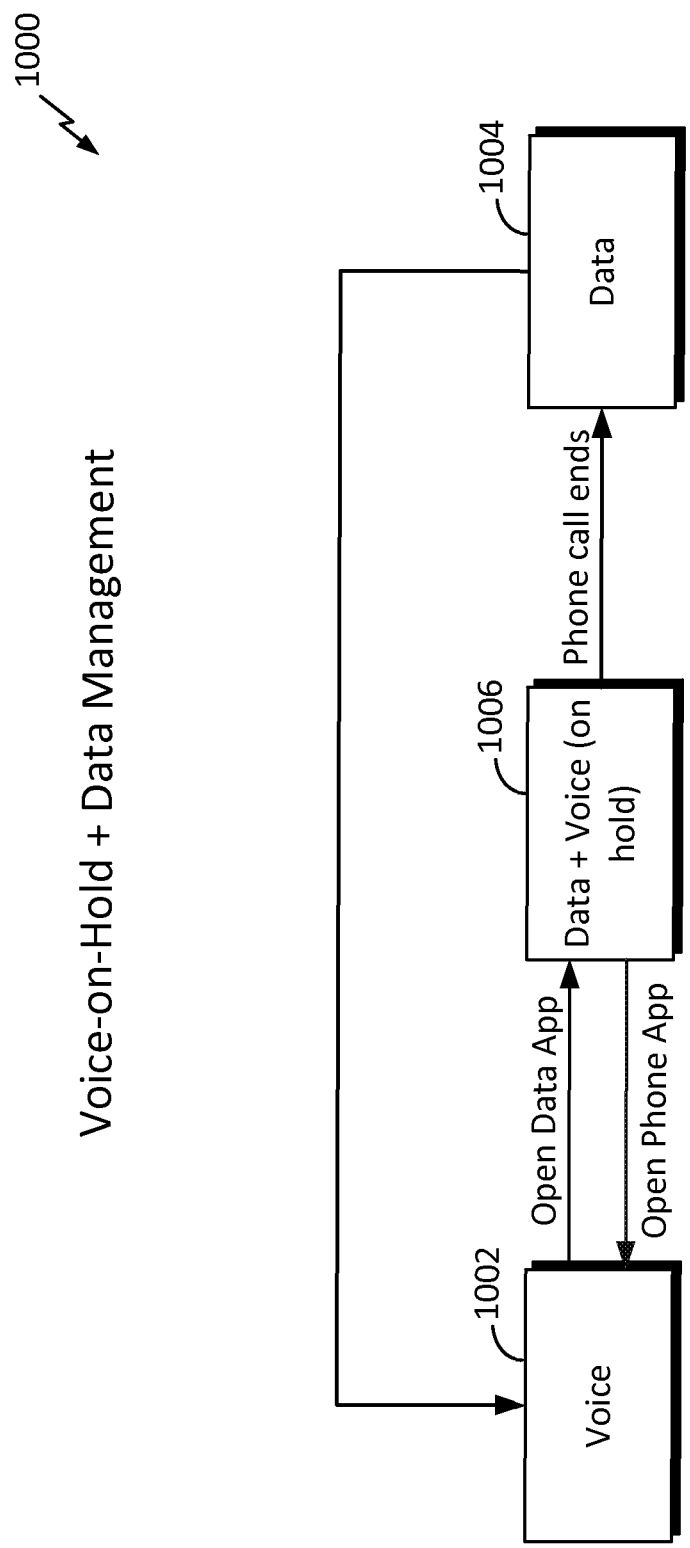
FIG. 10 is a diagram illustrating an example of voice call and data call management process in accordance with an aspect of the disclosure.

FIG. 10 is a diagram illustrating an example of voice call and data call management process 1000 in accordance with an aspect of the disclosure. For example, the method 1000 may be operable at any of the UEs of FIGS. 1, 2, 4, and/or 15. The UE may establish a voice call 1002 and a data call 1004 with different subscriptions. Initially, the UE may have an active voice call 1002 ongoing. At a certain time later, for example, the UE may need to handle the data call 1004 while the voice call 1002 is still ongoing. For example, when a data application (Data App) associated with the data call is opened by a user or becomes the foreground application, the UE may switch to the data call and put the voice call on hold (block 1006). At block 1006, if the voice call ends (e.g., remote caller hangs up or disconnects), only the data call remains active. However, at block 1006, if a phone application (e.g., dialer app) is opened by the user or becomes the foreground application at the UE, the UE may make the voice call active and end or suspend the data call. In the process 1000, the state of the UE is changed based on which of the data or voice call is the foreground task.

Figure 11:
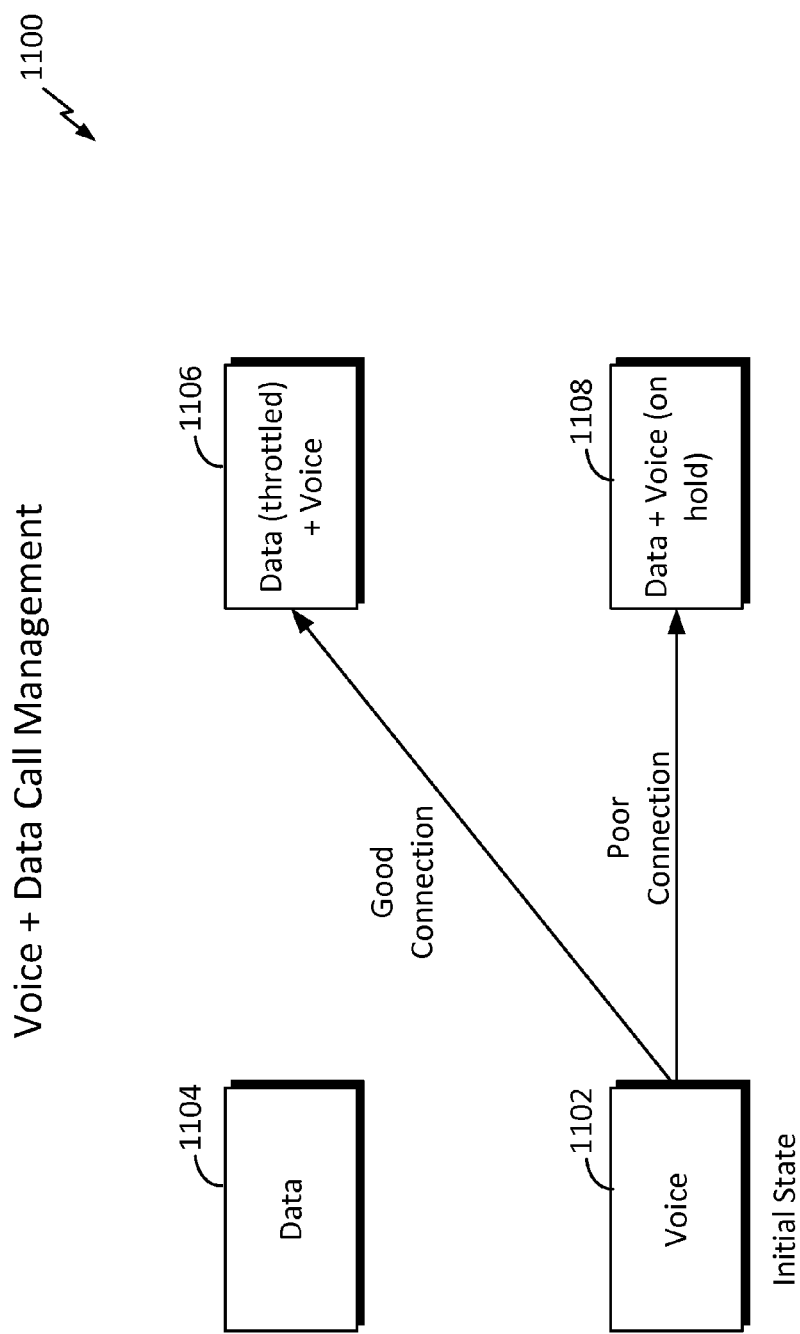
FIG. 11 is a diagram illustrating a first example of simultaneous voice call and data call management process in accordance with another aspect of the disclosure.

FIG. 11 is a diagram illustrating a first example of simultaneous voice call and data call management process 1100 in accordance with an aspect of the disclosure. For example, the process 1100 may be operable at any of the UEs of FIGS. 1, 2, 4, and/or 15. An UE may establish a voice call 1102 and a data call 1104 with different subscriptions. Initially, the UE may have only the voice call 1102 ongoing. At a certain time, for example, the UE may need to handle the data call 1104 while the voice call 1102 is still ongoing. When the data call is a foreground application, the management of the voice and data calls may be based on the quality of the voice call and data call connections. For example, the quality of the connections may be based on the radio link quality that may be reported by a modem 418 via a modem API 421 to an operating system 412 of the UE. At block 1106, if the connection quality is sufficiently good, the UE may simultaneously keep both voice and data calls active by throttling the data call while the voice call is ongoing. For example, the connection quality may be determined based on modem information 420, which includes at least one of error rates, channel quality (e.g., CQI), requested data rate, available data rate, receive power, transmit power headroom, round trip times, etc. At block 1108, if the connection quality is poor, the UE may keep the data call active and put the voice call on hold. At block 1108, in some aspects of the disclosure, the UE may send an indication (e.g., tones) to the remote caller to indicate that the voice call is going to be put on hold.

Figure 12:
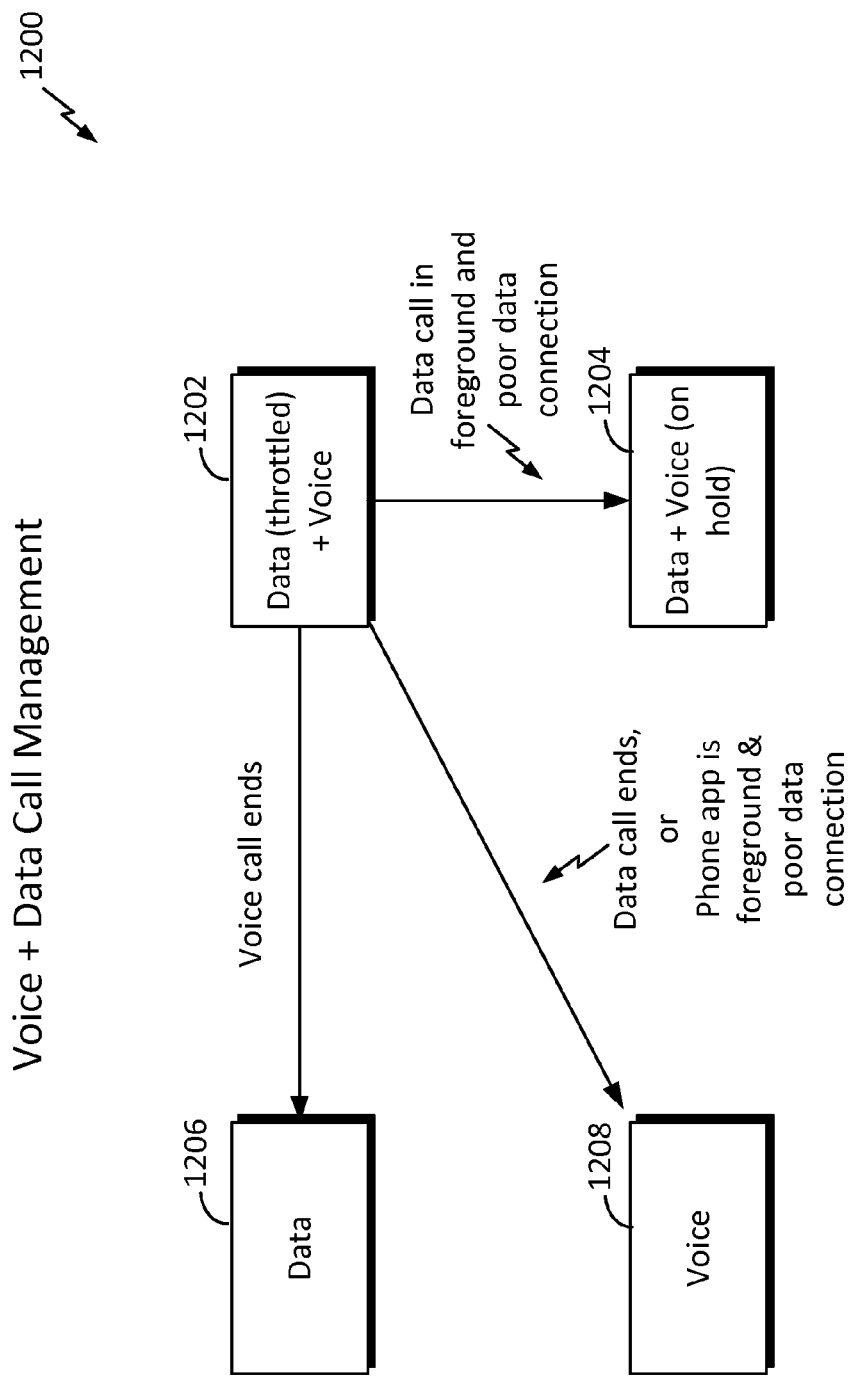
FIG. 12 is a diagram illustrating a second example of simultaneous voice call and data call management process in accordance with another aspect of the disclosure.

FIG. 12 is a diagram illustrating a second example of simultaneous voice call and data call management process 1200 in accordance with an aspect of the disclosure. For example, the method 1200 may be operable at any of the UEs of FIGS. 1, 2, 4, and/or 15. At block 1202, an UE may simultaneously establish an active data call and an active voice call. The data call may be throttled in order to keep both calls active while providing a certain voice call quality to the user. At block 1206, if the voice call ends, the UE may continue with the data call. At block 1206, the data call may utilize a higher data rate because the voice call has ended. At block 1204, if the data call becomes a foreground application and data connection quality is poor or undesirable, the UE may put the voice call on hold while keeping the data call active. At block 1208, if the data call ends (or suspended), the UE may make the voice call active. In addition, if a phone application (e.g., dialer app) becomes a foreground application and data connection quality is poor or undesirable, the UE may end or suspend the data call and keep only the voice call active.

Figure 13:
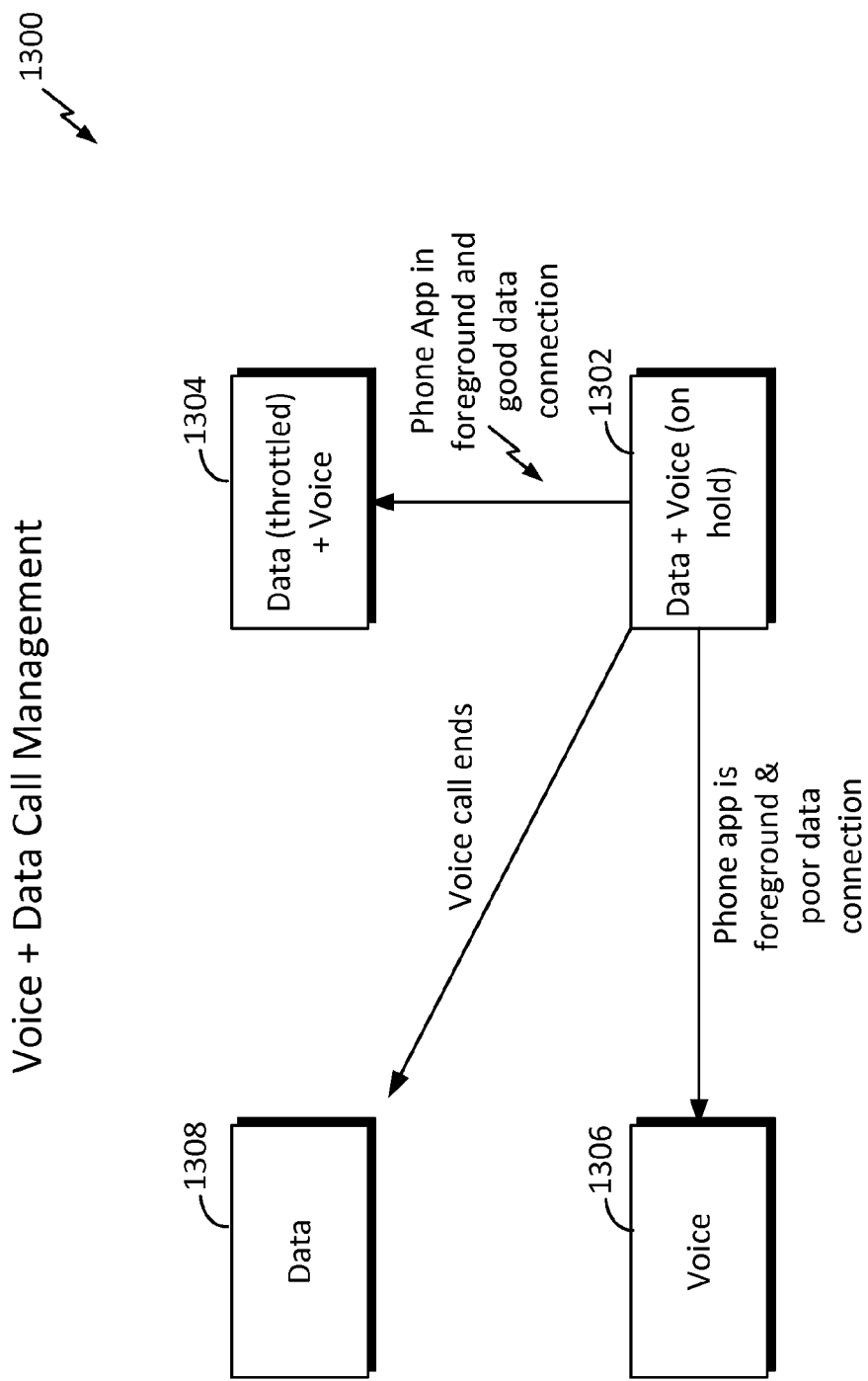
FIG. 13 is a diagram illustrating a third example of simultaneous voice call and data call management process in accordance with another aspect of the disclosure.

FIG. 13 is a diagram illustrating a third example of simultaneous voice call and data call management process 1300 in accordance with an aspect of the disclosure. For example, the process 1300 may be operable at any of the UEs of FIGS. 1, 2, 4, and/or 15. At block 1302, an UE may keep a data call active and put a voice call on hold. At block 1304, if a phone application (e.g., dialer) becomes a foreground application and data connection quality is sufficiently good, the UE may throttle the data call and keep the voice call active. At block 1306, however, if the data connection quality is poor or undesirable, the UE may end or suspend the data call and only keep the voice call active. At block 1308, if the voice call ends, the UE may keep the data call active.

Figure 14:
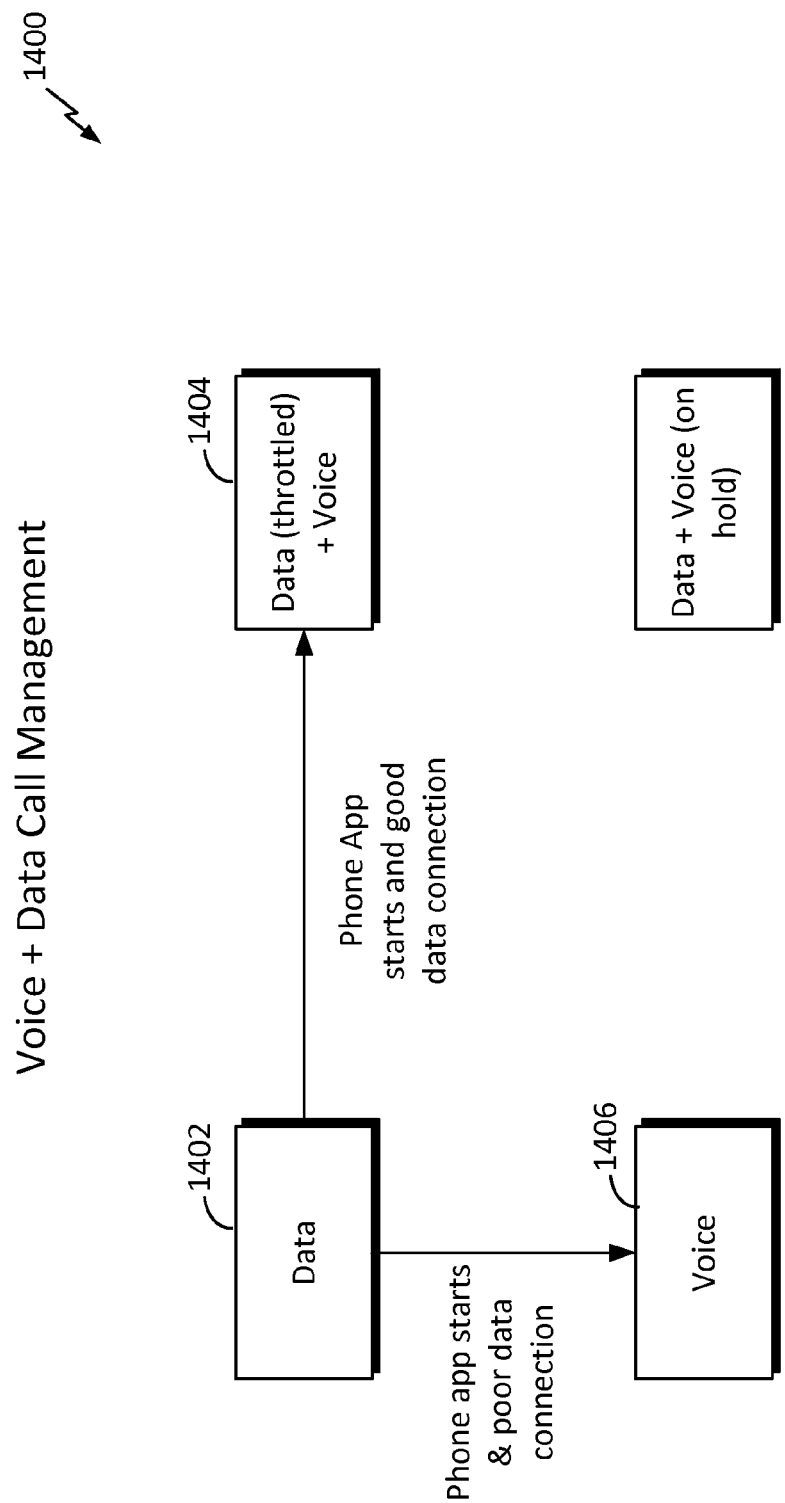
FIG. 14 is a diagram illustrating a fourth example of simultaneous voice call and data call management process in accordance with another aspect of the disclosure.

FIG. 14 is a diagram illustrating a fourth example of simultaneous voice call and data call management process 1400 in accordance with an aspect of the disclosure. For example, the method 1400 may be operable at any of the UEs of FIGS. 1, 2, 4, and/or 15. At block 1402, an UE has an active data call. At a certain time, a phone application (e.g., dialer) is started or becomes foreground. At block 1404, if the data connection quality is sufficiently good, the UE may simultaneously keep both the data call and voice call active by throttling the data call. At block 1406, however, if the data connection quality is poor or undesirable, the UE may end or suspend the data call and only keep the voice call active.

In aspects of the disclosure, the decision to throttle/end/suspend the data call and/or make the voice call active or on-hold in FIGS. 1-14 may be made by the operating system 412 or the user of the UE 402 through the operating system 412, which may provide information of the connections to the user based on the modem information 420. In some other aspects of the disclosure, the decision may be made by the modem itself without involving the operating system and/or user.

Figure 15:
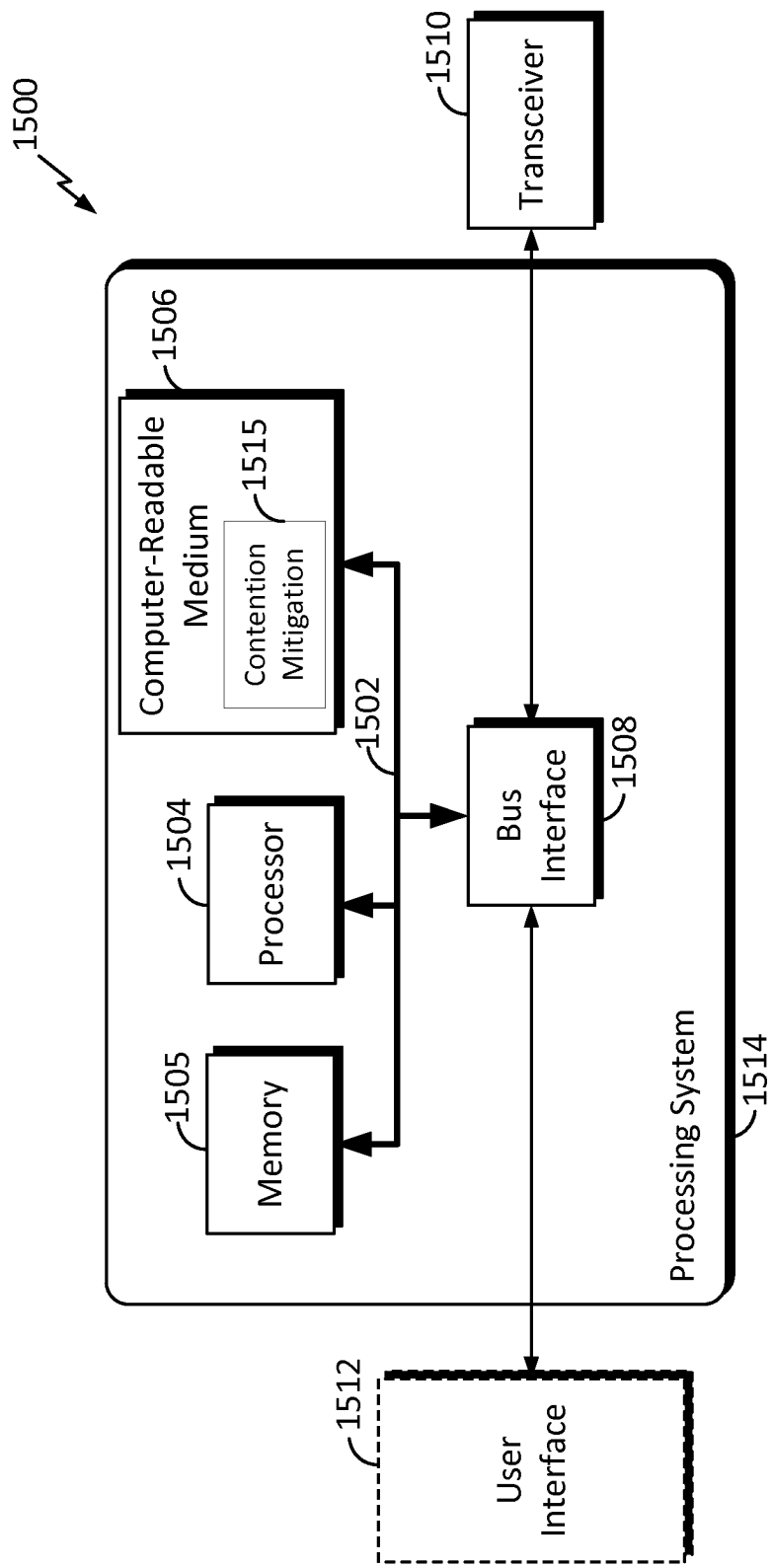
FIG. 15 is a block diagram illustrating an example of a hardware implementation for an apparatus employing a processing system in accordance with an aspect of the disclosure.

FIG. 15 is a conceptual diagram illustrating an example of a hardware implementation for an apparatus 1500 employing a processing system 1514. In accordance with various aspects of the disclosure, an element, or any portion of an element, or any combination of elements may be implemented with a processing system 1514 that includes one or more processors 1504. For example, the apparatus 1500 may be a UE as illustrated in any one or more of FIGS. 1,2, and/or 4. In another example, the apparatus 1500 may be a radio network controller (RNC) as illustrated in FIGS. 1 and/or 2. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 1504, as utilized in an apparatus 1500, may be used to implement any one or more of the processes described and illustrated in FIGS. 5-14.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 links together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a means for communicating with various other apparatus over a transmission medium. For example, the transceiver 1510 may include one or more modems, RF front end circuitries, etc., for supporting DSDA connections with multiple subscriptions. Depending upon the nature of the apparatus, a user interface 1512 (e.g., keypad, display, speaker, microphone, joystick, touchpad, or touchscreen) may also be provided.

The processor 104 is responsible for managing the bus 1502 and general processing, including the execution of software stored on the computer-readable medium 1506. For example, the software, when executed by the processor 1504, causes the processing system 1514 to perform the various functions described in FIGS. 5-14 for any particular apparatus. For example, the software may be a contention mitigation software 1515 when executed by the processor 1504 causes the UE to perform the various methods, functions, and processes described in relation to FIGS. 4-14. The computer-readable medium 1506 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506. The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE), comprising:
    establishing a first active connection;
    establishing a second active connection, simultaneous to the first active connection;
    providing, from a modem, modem information corresponding to connection qualities of the first active connection and second active connection, to an operating system of the UE via a modem application program interface (API), wherein the operating system is configured to provide services to user applications running on the UE; and
    degrading at least one of the first active connection or second active connection in accordance with a decision given by the operating system based on the modem information, to mitigate contention between the first active connection and second active connection,
    wherein the modem information comprises at least one of error rates, requested data rate, available data rate, receive power, transmit power headroom, or round trip times corresponding to the first connection or the second connection.

2. The method of claim 1, further comprising:
    providing a user of the UE with information about the first active connection and second active connection;
    receiving an input from the user regarding which of the first and second active connections to be degraded; and
    making the decision for mitigating contention in accordance with the input from the user.

3. The method of claim 1, wherein the mitigating contention comprises at least one of:
    prioritizing one of the first active connection or second active connection over the other;
    throttling data of at least one of the first active connection or second active connection; or
    putting at least one of the first active connection or second active connection on hold.

4. The method of claim 1,
    wherein the first active connection comprises a first voice call, and the second active connection comprises a second voice call, and
    wherein the mitigating contention comprises putting one of the first voice call or second voice call on hold by:
        transmitting at a data rate lower than that of an active voice call;
        transmitting periodic tones; or
        forgoing transmission of data except keep-alive data.

5. The method of claim 1,
    wherein the first active connection comprises a voice call and the second active connection comprises a data call, and
    wherein the mitigating contention comprises:
        if the data call is a foreground application relative to the voice call, throttling the data call or putting the voice call on hold, based on respective connection qualities of the first active connection and second active connection; and
        if the voice call is a foreground application relative to the data call, suspending or throttling the data call based on respective connection qualities of the first active connection and second active connection.

6. A method of wireless communication operable at a user equipment (UE), comprising:
   establishing a first active connection;
   establishing a second active connection, simultaneous to the first active connection;
   providing, from a modem, modem information corresponding to connection qualities of the first active connection and second active connection, to an operating system of the UE via a modem application program interface (API), wherein the modem information comprises at least one of error rates, requested data rate, available data rate, receive power, transmit power headroom, or round trip times;
   providing, utilizing the operating system, information about the connection qualities of the first active connection and second active connection, to a user;
   making a decision for mitigating contention between the first active connection and second active connection in accordance with an input from the user; and
   degrading at least one of the first active connection or second active connection in accordance with the decision, to mitigate contention between the first active connection and second active connection.

7. The method of claim 6, wherein the mitigating contention comprises at least one of:
   prioritizing one of the first active connection and second active connection over the other;
   throttling at least one of the first active connection or second active connection; or
   putting at least one of the first active connection or second active connection on hold.

8. The method of claim 6,
   wherein the first active connection comprises a first voice call, and the second active connection comprises a second voice call,
   wherein the mitigating contention comprises putting one of the first voice call or second voice call on hold by:
      transmitting at a data rate lower than that of an active voice call;
      transmitting periodic tones; or
      forgoing transmission of data except keep-alive data.

9. A user equipment (UE) for wireless communication, comprising:
   a first access circuitry configured to establish a first active connection;
   a second access circuitry configured to establish a second active connection, simultaneous to the first active connection;
   a modem circuitry configured to provide modem information corresponding to connection qualities of the first active connection and second active connection, to an operating system of the UE via a modem application program interface (API), wherein the operating system is configured to provide services to user applications running on the UE; and
   at least one processor configured to:
      receive the modem information from the modem circuitry; and
      degrade at least one of the first active connection or second active connection in accordance with a decision given by the operating system based on the modem information, to mitigate contention between the first active connection and second active connection,
   wherein the modem information comprises at least one of error rates, requested data rate, available data rate, receive power, transmit power headroom, or round trip times corresponding to the first connection or the second connection.

10. The user equipment of claim 9, further comprising a user control circuitry configured to:
   provide a user of the UE with information about the first active connection and second active connection; and
   receive an input from the user regarding which of the first and second active connections to be degraded,
   wherein the at least one processor is further configured to:
   make the decision for mitigating contention in accordance with the input from the user.

11. The user equipment of claim 9, wherein the at least one processor is further configured to mitigate contention by at least one of:
   prioritizing one of the first active connection or second active connection over the other;
   throttling data of at least one of the first active connection or second active connection; or
   putting at least one of the first active connection or second active connection on hold.

12. The user equipment of claim 9,
   wherein the first active connection comprises a first voice call, and the second active connection comprises a second voice call, and
   wherein the at least one processor is further configured to put one of the first voice call or second voice call on hold by:
      transmitting at a data rate lower than that of an active voice call;
      transmitting periodic tones; or
      forgoing transmission of data except keep-alive data.

13. The user equipment of claim 9,
   wherein the first active connection comprises a voice call and the second connection comprises a data call, and
   wherein the at least one processor is further configured to:
      if the data call is a foreground application relative to the voice call, throttle the data call or put the voice call on hold, based on respective connection qualities of the first active connection and second active connection; and
      if the voice call is a foreground application relative to the data call, suspend or throttle the data call based on respective connection qualities of the first active connection and second active connection.

14. A user equipment (UE) for wireless communication, comprising:
   a first access circuitry configured to establish a first active connection;
   a second access circuitry configured to establish a second active connection, simultaneous to the first active connection;
   a modem circuitry configured to provide modem information corresponding to connection qualities of the first active connection and second active connection, to an operating system of the UE via a modem application program interface (API), wherein the modem information comprises at least one of error rates, requested data rate, available data rate, receive power, transmit power headroom, or round trip times;
   at least one processor configured to, utilizing the operating system, provide a user with information about the connection qualities of the first active connection and second active connection, and make a decision for mitigating contention between the first active connection and second active connection in accordance with an input from the user,
wherein the modem circuitry is configured to degrade at least one of the first active connection or second active connection in accordance with the decision, to mitigate contention between the first active connection and second active connection.

15. The user equipment of claim 14, wherein the modem circuitry is further configured to mitigate contention by at least one of:
prioritizing one of the first active connection and second active connection over the other;
throttling at least one of the first active connection or second active connection; or
putting at least one of the first active connection or second active connection on hold.

16. The user equipment of claim 14,
wherein the first active connection comprises a first voice call, and the second active connection comprises a second voice call,
wherein the modem circuitry is further configured to put one of the first voice call or second voice call on hold by:
transmitting at a data rate lower than that of an active voice call;
transmitting periodic tones; or
forgoing transmission of data except keep-alive data.

17. The method of claim 1,
wherein the first active connection is associated with a first subscription, and
wherein the second active connection is associated with a second subscription.

18. The method of claim 6,
wherein the first active connection is associated with a first subscription, and
wherein the second active connection is associated with a second subscription.

19. The UE of claim 9,
wherein the first active connection is associated with a first subscription, and
wherein the second active connection is associated with a second subscription.

20. The UE of claim 14,
wherein the first active connection is associated with a first subscription, and
wherein the second active connection is associated with a second subscription.

\* \* \* \* \*